United States Patent [19]

Hardy

[11] Patent Number: 4,619,019
[45] Date of Patent: Oct. 28, 1986

[54] FISH SCALING DEVICE

[76] Inventor: Clifford D. Hardy, 6296 Ashton Rd., Memphis, Tenn. 38134

[21] Appl. No.: 740,981

[22] Filed: Jun. 4, 1985

[51] Int. Cl.[4] .............................................. A22C 25/02
[52] U.S. Cl. ....................................................... 17/67
[58] Field of Search .................. 17/18, 19, 21, 50, 62, 17/64, 66, 67

[56] References Cited

U.S. PATENT DOCUMENTS

| | | | |
|---|---|---|---|
| 3,156,276 | 11/1964 | Petrella et al. | 17/67 X |
| 3,328,834 | 7/1967 | Pulcifer | 17/67 |
| 3,590,424 | 7/1971 | Shults | 17/64 |
| 4,063,332 | 12/1977 | McCullough | 17/67 X |
| 4,107,819 | 8/1978 | Saizon | 17/64 |
| 4,162,558 | 7/1979 | Rubio | 17/67 |

FOREIGN PATENT DOCUMENTS 1101621  5/1981  Canada ..................................... 17/64

Primary Examiner—Willie G. Abercrombie
Attorney, Agent, or Firm—Munson H. Lane, Jr.

[57] ABSTRACT

A hand held, power operated rotary fish scaler includes a motor driven elongated scaling tool having fixed blades with tapered leading edges arranged equally spaced from one another around the axis of the scaling tool. The scaling tool includes a shank which is removably secured to both the scaling tool and motor for rotating about the axis of the shank. When the scaling tool is rotated and placed in contact with the fish, the tapered leading edges of the blades of the scaling tool slide between the fishes scales and flesh, lifting the scales away from the fish's body and discharging them in a direction perpendicular to the blades.

14 Claims, 13 Drawing Figures

U.S. Patent   Oct. 28, 1986   Sheet 1 of 2   4,619,019
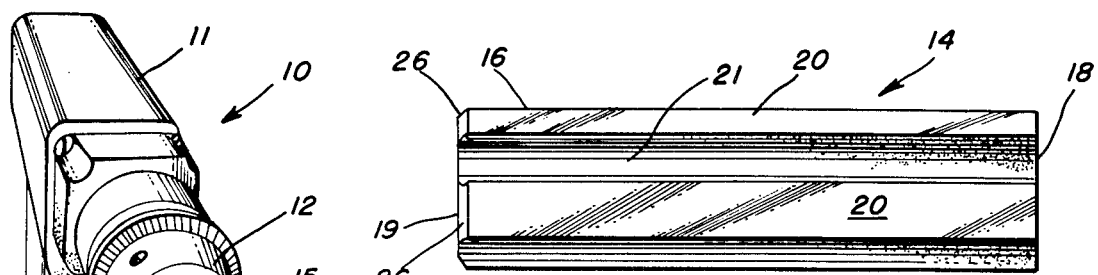
FIG. 1
FIG. 2
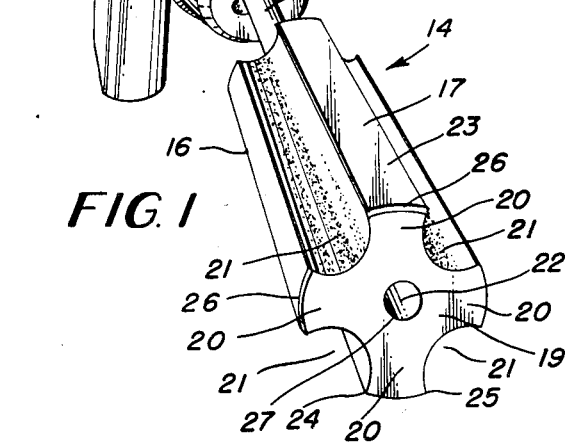
FIG. 3
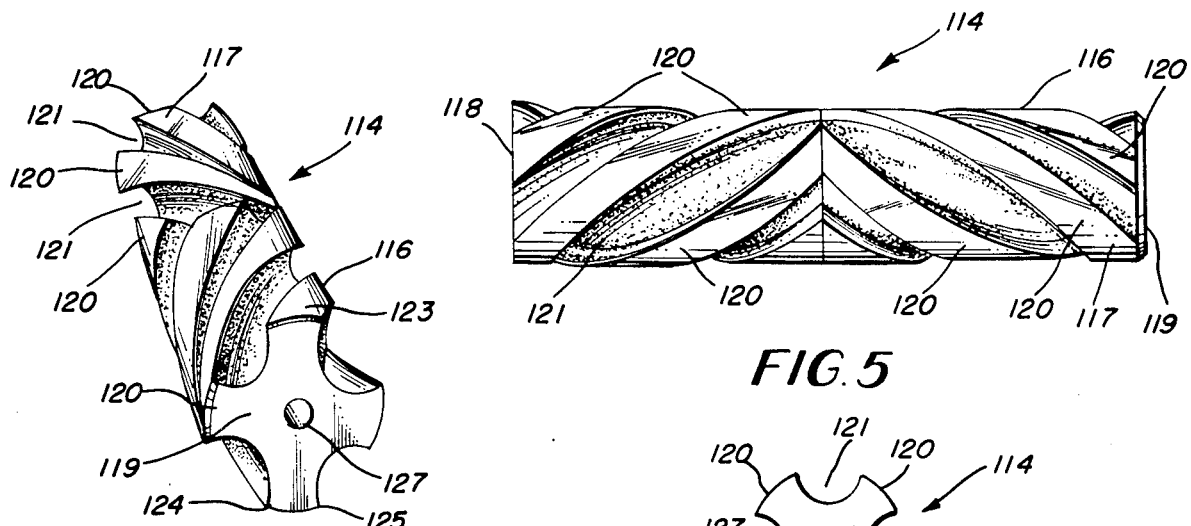
FIG. 4
FIG. 5
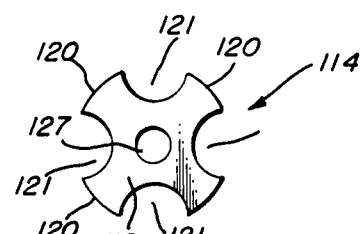
FIG. 6
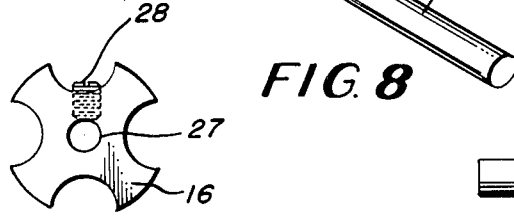
FIG. 7
FIG. 8
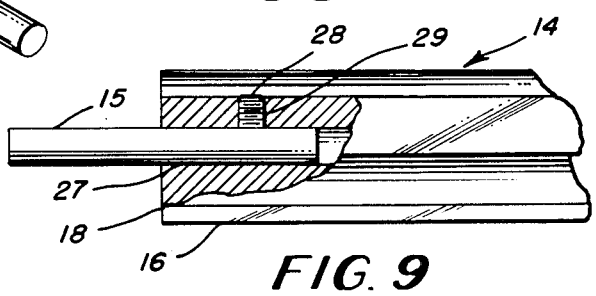
FIG. 9

FISH SCALING DEVICE

BACKGROUND OF THE INVENTION a. Field of the Invention

This invention generally relates to a rotary fish scaling device and more particularly to a hand-held portable powered rotary device for the scaling of fish.

b. Description of the Prior Art

Devices for the scaling of fish and the controlling of the dislodged scales have been addressed repeatedly in prior art. Usually the prior art devices have been in the form of an elongated member having elevated ridges, teeth, lugs or other abrasive devices, either attached to, or integral with the member body and protruding radially outward. The intent of such devices being to dislodge fish scales when rotated rapidly by a small hand-held power unit such as an electric drill. The method of removal being scraping, raking impact, cutting or abrasion. It appears that the design and function of prior art devices permits the dislodged scales to be discharged and deflected in an exceedingly unpredictable direction and pattern, thus creating a major contamination and clean-up problem for the user. Also it appears that the prior art devices, because of the radially outward protruding elements which contact the scales, often do damage to the flesh and skin of the fish being scaled by means of cutting, bruising or tearing. The absence of rotary fish scalers in the marketplace attests to the failure of prior art devices to successfully meet the goals and needs for which they were designed.

The following patents are representative of the prior art:

| | | |
|---|---|---|
| 3,328,834 | Pulcifer | July 4, 1967 |
| 3,590,424 | Shults | July 6, 1971 |
| 4,107,819 | Saizon | Aug 22, 1978 |
| 4,162,558 | Rubio | July 31, 1979 |

The prior art fish scalers represented by the above patents distinguish from the present invention in that the blades of the tool are elevated above the peripheral surface of the body of the tool and/or the edges of the tool are interrupted by notches, serrations and the like. They remove scales by impact, scraping, abrasion or raking.

In contrast, the fish scaler of the present invention has blades whose edges are smooth and uninterrupted and lie in the peripheral surface of the body of the tool, making the tool safe to use without excessive danger of cutting into the flesh of the fish being scaled or into the flesh of an operator.

SUMMARY OF THE INVENTION

It is an object of this invention to provide an improved fish scaling device which is simple in construction and is economically manufactured in large quantities for public distribution.

It is a further object of this invention to provide an improved rotary fish scaling device comprising a portable rotary driver and an elongated body member having an interrupted peripheral surface, a pair of opposite ends, a plurality of equally spaced blades extending along the body member between its ends and a plurality of grooves formed in the body member and alternating with the blades, and a shank extending axially from one end of the body member for driven engagement with the rotary driver. Each of the blades of the body member has a surface portion coincident with the peripheral surface of the body member between grooves and a pair of longitudinally extending edges on opposite sides of the blade where the grooves on the opposite sides of the blade interrupt the peripheral surface of the body member. When the body member, driven by the rotary driver, is brought into contact with the scales of a fish in a manner such that the axis of the body member is generally parallel to the body surface of the fish in the area of contact, the leading edges of the blades engage under the scales of the fish as the body member is rotated and lift the scales from the surface of the fish. The fish scales are discharged from the rotary scaling device in a direction perpendicular to the edge of the blades.

Important features of the invention are: the edges of the blades of the fish scaler are smooth and uninterrupted for their full length so that they lift the fish scales without digging into the skin and flesh of the fish, the edges of the blades lie within the peripheral surface of the body of the fish scaler, the edges of the blades are undercut by the grooves formed in the body of the scaler and the edges of the blades do not need to be extremely sharp since they do not provide a cutting function. The fish scaler of the invention, because of the aforesaid features, is a safe tool which does not easily cut into the flesh of the fish being scaled nor into the flesh of an operator.

An important advantage of the invention is that the fish scaler is a light, portable tool which removes scales with a rapid motion and gives directional control of the scales as they are discharged.

Another important advantage of this invention is the manner in which it removes scales. The fish scaler of this invention removes the scales by means of thin tapered smooth edged blades which slide between the scales and the flesh of the fish being scaled and with a lifting motion, lift the scales away from the flesh in an easy manner.

The hand held, power operated rotary fish scaler of the present invention includes a motor driven, elongated scaling tool having fixed blades with tapered leading edges. The blades are arranged equally spaced about the axis of the scaling tool inorder to maintain balance uniformity of the tool. The scaling tool includes a shank which extends axially from one end of the tool. For ease of construction, the shank is removably secured in an axial bore extending into one end of the tool, however, the shank may be formed as an integral part of the body of the tool, or if made separately from the tool, it may be fixed in the axial bore provided in the tool. The shank is adapted for removable engagement with a chuck or other means for securing the scaler in a rotary driver.

When said tool is rotated in contact with a fish, the tapered leading edge of the blade slides between the scales and the flesh of the fish and with a lifting motion which lifts the scales away from the body of fish and discharges scales in a direction perpendicular to said blade.

In the preferred embodiment of said tool, the blades are spiraled half the length of said tool in a clockwise direction, the other half spiraled in a counter-clockwise direction, thus forming a scaling tool with an inverted center spiral. The blades extend the full length of the said scaling tool. In another embodiment of the scaling too, the blades are equally spaced around the tool and extend in a longitudinal direction along the entire length of the tool axis.

The blades in either embodiment are formed by oval grooves extending inwardly from the peripheral surface of the tool. The blades are thin and smooth, however, they are not excessively sharp. The tool removes the scales in a safe and efficient manner. It removes the scales thoroughly and completely without damage to the fish or the operator of said scaler.

The scaling tool may be made from any material which is of sufficient strength and hardness to retain its shape and well defined lines. The preferred material is heat treated, machine grade anodized aluminum.

The preferred dimension of the scaler tool is about one inch in diameter and three or four inches in length. The shank of the tool should be no more than about one-fourth inch. The large diameter and small shank give additional convenience when removing scales around the dorsal and belly fins. The large diameter gives better control of scale direction.

A variable speed electric motor is the preferred means for driving the rotary fish scaler of this invention.

A scale catcher is an auxiliary part of this invention which is adapted to be secured to the housing of a portable hand drill or motor by which the fish scaling tool is driven and to catch the scales as they are removed from the fish by the scaling tool. The scale catcher is an elongated scoop-like housing which partially encloses the rotary fish scaling tool on the side of the tool in the direction in which scales are discharged.

BRIEF DESCRIPTION OF THE DRAWINGS

With the foregoing objects and features in view and such other objects and features which may become apparent as the specification proceeds, the invention will be understood from the following description taken in conjunction with the accompanying drawings wherein like characters of reference designate like parts and wherein:

FIG. 1 is a perspective view of one embodiment of the invention showing the fish scaling tool of this invention secured in the chuck of a hand-held, electric motor;

FIG. 2 is a side elevational view of the fish scaling tool of FIG. 1;

FIG. 3 is an end view of the right-hand end of the tool shown in FIG. 2;

FIG. 4 is a perspective view of a second and preferred embodiment of the invention;

FIG. 5 is a side elevational view of the embodiment shown in FIG. 4;

FIG. 6 is a left-hand end view of the embodiment shown in FIG. 5;

FIG. 7 is an end view of the tool shown in FIG. 9;

FIG. 8 is a perspective view of the shank separated from the tool shown in FIG. 9;

FIG. 9 is an elevational view of the tool shown in FIG. 1 with a portion of the tool shown in section inorder to show the manner of securing a shank to the tool body.

DETAILED DESCRIPTION OF THE INVENTION

Figure 10:
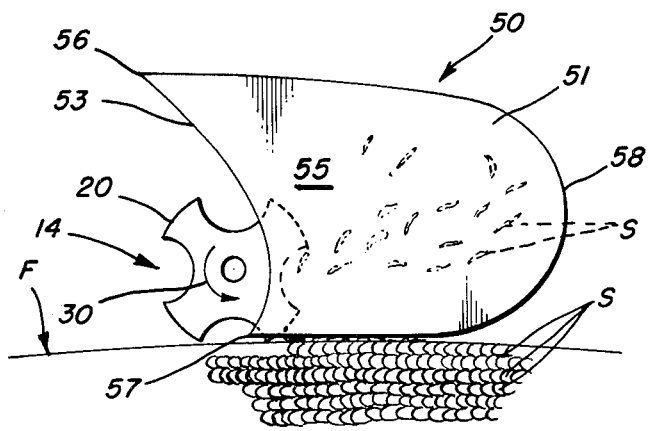
FIG. 10 is an end view of the tool of FIG. 1 contacting the surface of a fish for scaling the fish and of a scale catcher supported alongside the tool for catching the scales discharged by the tool.

Referring now to the drawings and particularly to FIGS. 1 through 3, one embodiment of the fish scaling device of this invention is designated by the reference numeral 10 and comprises a portable, hand-held electric drill motor 11, having a chuck 12 and a rotary fish scaling tool 14 having a shank 15 extending axially from one end and engaged by the chuck 12 of the drill motor.

The fish scaling tool 14 comprises an elongated body member 16 having an interrupted peripheral surface 17, a pair of opposite ends 18 and 19, a plurality of equally spaced blades 20, extending longitudinally along the body member between the ends 18 and 19, and a plurality of grooves 21 formed in the body member between the ends 18 and 19 and alternating with the blades 20.

The body of the fish scaling tool 14 is generally cylindrical and is shown with four blades 20 alternating with four grooves 21. The tool may have more or less blades than the four blades shown in FIGS. 1-3, the number required being less for a high speed drive means and greater for a slow speed drive means.

Each of the blades 20 extends generally radially from the axis 22 of the body member 16 and includes a surface portion 23 which is coincident with the peripheral surface 17 of the body member, and a pair of longitudinally extending edges 24 and 25 on opposite sides of the blade where the generally oval-shaped grooves 21 on the opposite side of the blade interrupt the peripheral surface of the body member. The grooves 21 undercut the edges 24 and 25 of the blades 20 so that the edges 24 and 25 have a generally tapered shape. Preferably, at least the end 19 of the fish scaling tool 14 which is remote from the shank 15 is beveled as shown at 26 where the end joins the peripheral surface 17 of the body member 16. Both ends 18 and 19 may be beveled in like manner to reduce the danger of cutting the flesh of a fish or operator while the tool is rotating.

FIG. 2 of the drawing shows the body member 16 of the fish scaling tool 14 without the shank 15. FIG. 3 shows the end 18 of the body member 16 with an axial bore 27 for receiving the shank 15. FIGS. 7 and 9 show one means for securing a separate shank as shown in FIG. 8 in the axial bore 27 at one end 18 of the fish scaling tool body member 16. The means shown comprises a set screw 28 secured in a threaded bore 29 extending radially through the body member 16 from the bottom of one of the grooves 21 to intersect with the axial bore 27. The shank 15 may be secured to one end of the body member 16 by other suitable means, such as by being press fit into an axial bore of lesser diameter than the diameter of the shank, or it may be formed as an integral part of the body member by machining or by other suitable means. The reason for fitting the fish scaling tool 14 with a removable shank 15 is so that when desired the shank 15 can be removed and the shaft of a rotary motor or other drive means may be inserted in the axial bore 27 and may be secured there by means of the set screw 28.

A second and preferred embodiment of the fish scaling tool of this invention is designated by the reference numeral 114 in FIGS. 4 through 6. The fish scaling tool 114 comprises an elongated body member 116 having an interrupted peripheral surface 117, a pair of ends 118 and 119, a plurality of equally spaced blades 120 spiralled about the body member 116 clockwise for one-half the length of the member 116 and spiralled about the body member 116 counterclockwise for the other half of the length of body member 116, and a plurality of similarly spiralled grooves 121 formed in the body member between ends 118 and 119 and alternating with the blades 120. An axial bore 127 is provided in one or both ends of the body member 116 for receiving the separate shank 15 in the same manner as illustrated in FIG. 9 with reference to the first embodiment of the fish scaling tool 14.

Each of the blades 120 has a surface portion 123 which is coincident with the peripheral surface 117 of body member 116 and a pair of longitudinally extending edges 124 and 125 on opposite sides of the blade where the grooves 121 on the opposite sides of the blade interrupt the peripheral surface of the body member.

Figure 11:
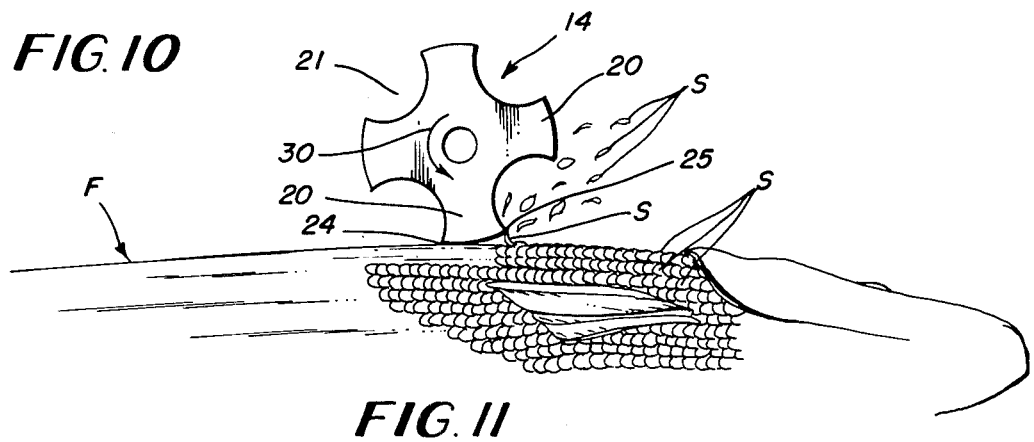
FIG. 11 is a view similar to FIG. 10 showing the fish scaling tool without the scale catcher.

In FIGS. 10 and 11, the use of the scaling tool 14 in scaling a fish F is illustrated diagramatically. The tool 14 is positioned transversely of the body of the fish and in contact therewith. The direction of rotation of the tool 14 is indicated by the arrow 30. As the tool 14 rotates, the leading edge 25 of each blade engages the scales S and lifts them from the body of the fish. The scales S are discharged in a direction generally perpendicular to the blades.

Figure 12:
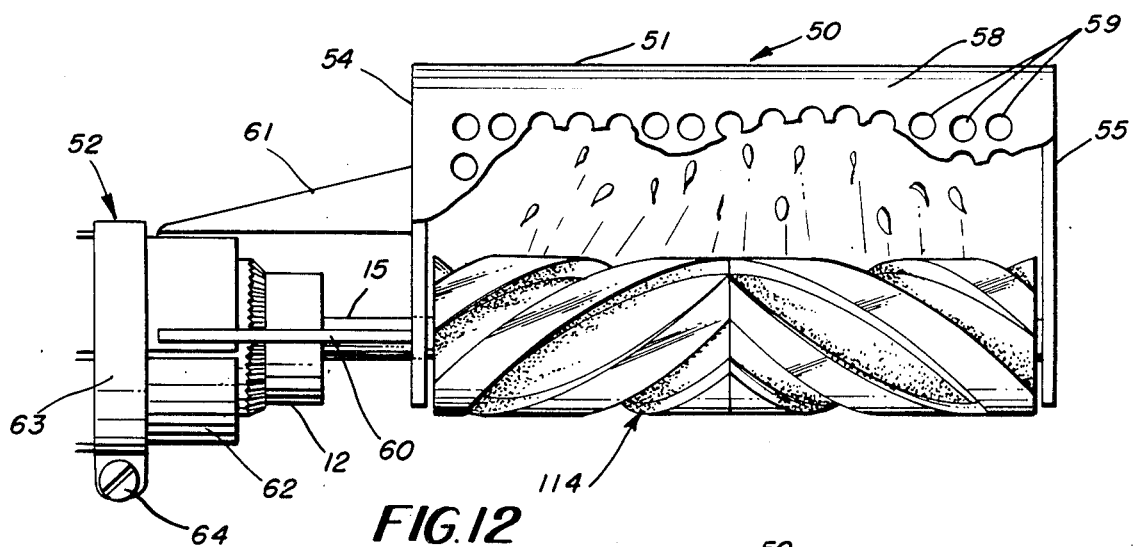
FIG. 12 is a top plan view of the fish scaling tool shown in FIGS. 4-6 secured in the chuck of a portable hand drill motor with a scale catcher, having its cover partially broken away to show the fish scaling tool, attached to the housing of the hand drill motor.
Figure 13:
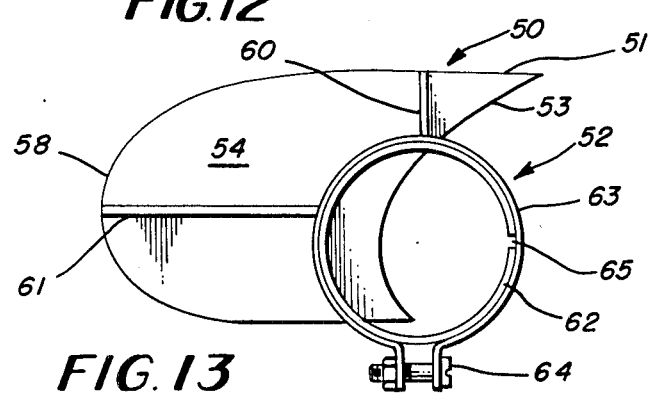
FIG. 13 is a left-hand end view of the scale catcher 50 illustrated in FIG. 12 but separated from the fish scaling tool 114.

FIG. 10 shows a scale catcher 50, now to be described, used in conjunction with the scaling tool 14 for catching the scales S that are discharged by the scaler after they are removed from the fish. The scale catcher 50 may be used in conjunction with either of the scaling tools 14 and 114. It is shown in FIG. 12 used in conjunction with the scaling tool 114.

The scale catcher 50 comprises a scoop-like body 51 and mounting means 52 for attaching the catcher to the housing of a rotary tool driver, such as the portable electric drill motor 11 shown in FIG. 1. The scoop-like body 51 has an open front 53, a pair of parallel end walls 54 and 55 which are spaced apart by a distance slightly exceeding the length of the fish scaling tools 14 and 114, a top edge 56, a bottom edge 57 offset inwardly from the top edge 56 and a generally U-shaped cover 58 formed about the similarly shaped end walls 54 and 55 between the edges 56 and 57 and secured to the peripheral edges thereof. The U-shaped cover 58 has rows of perforations 59 in the rear portion thereof to permit the escape of air and liquid therethrough while fish scales S are retained in the catcher.

The mounting means 52 comprises a split collar 62 which is large enough to fit over the nose of the portable drill motor 11 and to be clamped thereto by means of a screw clamping ring 63 and screw tightener 64. The split collar 62 is supported from the end wall 54 of the catcher 50 by triangularly-shaped bracket arms 60 and 61. The arms 60,61 are welded, glued or otherwise secured to the end wall 54 and similarly secured to the split collar 62 on one side of the gap 65 in the split collar.

While in the foregoing there have been described and shown preferred embodiments of the invention, various modifications and equivalents may be resorted to within the spirit and scope of the invention as claimed.

I claim:

1. A fish scaling tool adapted to be rotated by a portable rotary motor having tool drive means, said fish scaling tool comprising an elongated cylindrical body member having a longitudinal axis and an interrupted peripheral surface, a pair of flat opposite ends normal to said axis, a plurality of equally spaced parallel longitudinal blades extending generally radially along said body member between said ends, and a plurality of parallel longitudinal grooves formed in said body member between said ends and alternating with said blades, and a shank extending axially from one end of said body member for driven engagement with said tool drive means, each of said blades having a surface portion of substantial width coincident with the peripheral surface of said body member between grooves and a pair of smooth, continuous longitudinally extending edges on opposite sides of said blade where the grooves on opposite sides of said blade interrupt the peripheral surface of said body member, said grooves opening outwardly between adjacent blades and being of generally arcuate cross section and uniform depth between the longitudinal edges of adjacent blades, a space between longitudinal edges of adjacent blades providing an opening to said grooves whereby scales being removed from a fish may freely enter and leave said grooves.

2. The fish scaling tool of claim 1 wherein said grooves and said blades spiral about said body member for less than a full revolution over the length of said body.

3. The fish scaling tool of claim 1 wherein said grooves and said blades spiral about said body member in one direction for one-half the length of said body member and in the opposite direction for the other half of the length of said body member, said blades and grooves spiraling for less than a full revolution over one-half the length of said body in each of said halves.

4. The fish scaling tool of claim 1 wherein said elongated body member has an axial bore in said one end and said shank is removably secured in said axial bore.

5. The fish scaling tool of claim 1 wherein said elongated body member has a diameter of approximately one inch, said plurality of blades comprising two pairs of diametrically opposite blades, the blades of one pair being displaced 90° from adjacent blades of said other pair of blades.

6. The fish scaling tool of claim 1 wherein at least the end of said elongated body member opposite said one end with said shank is beveled adjacent the peripheral surface portion of said body member.

7. A fish scaling device comprising a hand held portable power operated rotary driver, a fish scaling tool, and means for operatively connecting said fish scaling tool to said driver to be rotated thereby, said fish scaling tool comprising an elongated cylindrical body member having a longitudinal axis and an interrupted peripheral surface, a pair of flat opposite ends normal to said axis, a plurality of equally spaced parallel longitudinal blades extending generally radially along said body member between said ends and a plurality of parallel longitudinal grooves formed in said body member between said ends and alternating with said blades, and a shank extending axially from one end of said body member for driven engagement with said tool drive means, each of said blades having a surface portion of substantial width coincident with the peripheral surface of said body member between grooves and pair of smooth, continuous longitudinally extending edges on opposite sides of each blade where the grooves on opposite sides of each blade interrupt the peripheral surface of said body member, said grooves opening outwardly between adjacent blades and being of generally arcuate cross section and uniform depth between the longitudinal edges of adjacent blades, a space between longitudinal edges of adjacent blades providing an opening to said grooves whereby scales being removed from a fish may freely enter and leave said grooves.

8. The fish scaling device of claim 7 together with a fish scale catcher positioned alongside of said fish scaling tool to catch fish scales discharged by said fish scaling tool, said fish scale catcher being an elongated receptacle having an open side positioned adjacent said tool through which fish scales removed from a fish by said tool enter the receptacle and support means extending between said catcher and said portable power operated rotary driver for rigidly supporting said catcher on said driver.

9. The fish scaling device of claim 8 wherein said support means for rigidly supporting said catcher comprises support arms attached to said receptacle and extending longitudinally from said receptacle to said driver, a split collar carried by said support arms, and clamping ring means encompassing said split collar for contracting said split collar, said rotary driver having a housing which is adapted to be held in the hand of an operator, and which has a nose portion, rotary means extending from said nose portion for driving said fish scaling tool, said fish scaling tool being connected to said rotary means by said means for operatively connecting said fish scaling tool to said driver, said split collar being positioned about said nose portion and tightened thereon by said clamping ring means.

10. The fish scaling device of claim 9 wherein said elongated receptacle has a pair of longitudinally spaced upstanding end walls and a cover of generally U-shaped configuration secured to and between said end walls, said cover forming a substantially flat bottom wall, a curved rear wall opposite said open side and a top wall overlying said bottom wall, said cover being continuous between a front edge of said bottom wall and a front edge of said top wall, said front edge of said bottom wall being offset inwardly from the front edge of said top wall, said receptacle being positioned relative to said fish scaling tool so that it partially encloses said tool.

11. The fish scaling tool of claim 10 wherein said cover has perforations therein of a size smaller than the scales of fish for permitting air and liquid to pass therethrough while fish scales are retained within the scale catcher.

12. A fish scaling device comprising a hand held portable power operated rotary driver, a fish scaling tool, means for operatively connecting said fish scaling tool to said driver to be rotated thereby and a fish scale catcher positioned alongside of said fish scaling tool to catch scales discharged by said fish scaling tool comprising an elongated cylindrical body member having a longitudinal axis and an interrupted peripheral surface, a pair of flat opposite ends normal to said axis, a plurality of equally spaced parallel longitudinal blades extending generally radially along said body member between said ends, and a plurality of parallel longitudinal grooves formed in said body member between said ends and alternating with said blades, and a shank extending axially from one end of said body member for driven engagement with said tool drive means, each of said blades having a surface portion of substantial width coincident with the peripheral surface of said body member between grooves and a pair of smooth, continuous longitudinally extending edges on opposite sides of said blade where the grooves on opposites sides of said blade interrupt the peripheral surface of said body member, said fish scale catcher being an elongated receptacle having an open side positioned adjacent said tool through which fish scales removed from a fish by said tool enter the receptacle and support means extending between said catcher and said portable power operated rotary driver for rigidly supporting said catcher on said driver, said support means comprising support arms attached to said receptacle and extending longitudinally from said receptacle to said driver, a split collar carried by said support arms, and clamping ring means encompassing said split collar for contracting said split collar, said rotary driver having a housing which is adapted to be held in hand of an operator and which has a nose portion, rotary means extending from said nose portion for driving said fish scaling tool, said fish scaling tool being connected to said rotary means by said means for operatively connecting said fish scaling tool to said driver, said split collar being positioned about said nose portion and tightened thereon by said clamping ring means.

13. The fish scaling device of claim 12 wherein said elongated receptacle has a pair of longitudinally spaced upstanding end walls and a cover of generally U-shaped configuration secured to and between said end walls, said cover forming a substantially flat bottom wall, a curved rear wall opposite said open side and a top wall overlying said bottom wall, said cover being continuous between a front edge of said bottom wall and a front edge of said top wall, said front edge of said bottom wall being offset inwardly from the front edge of said top wall, said receptacle being positioned relative to said fish scaling tool so that it partially encloses said tool.

14. The fish scaling tool of claim 13 wherein said cover has perforations therein of a size smaller than the scales of fish for permitting air and liquid to pass therethrough while fish scales are retained within the scale catcher.

* * * * *